United States Patent
Hartl et al.

(10) Patent No.: US 10,451,349 B2
(45) Date of Patent: Oct. 22, 2019

(54) METALLURGICAL CONTAINER

(71) Applicant: Primetals Technologies Austria GmbH, Linz (AT)

(72) Inventors: Franz Hartl, Kallham (AT); Jean-Pierre Klein, Vienna (AT); Martin Lehofer, Plainsboro, NJ (US); Andreas Rohrhofer, Linz (AT); Michael Weinzinger, Neuhofen a. d. Krems (AT)

(73) Assignee: PRIMETALS TECHNOLOGIES AUSTRIA GMBH (AT)

( * ) Notice: Subject to any disclaimer, the term of this patent is extended or adjusted under 35 U.S.C. 154(b) by 125 days.

(21) Appl. No.: 15/126,127

(22) PCT Filed: Mar. 9, 2015

(86) PCT No.: PCT/EP2015/054806
§ 371 (c)(1),
(2) Date: Sep. 14, 2016

(87) PCT Pub. No.: WO2015/139981
PCT Pub. Date: Sep. 24, 2015

(65) Prior Publication Data
US 2017/0102184 A1  Apr. 13, 2017

(30) Foreign Application Priority Data

Mar. 20, 2014 (EP) .................................. 14160813

(51) Int. Cl.
*F27D 19/00* (2006.01)
*B22D 41/12* (2006.01)
(Continued)

(52) U.S. Cl.
CPC ............ *F27D 19/00* (2013.01); *B22D 41/12* (2013.01); *B22D 45/00* (2013.01); *B22D 46/00* (2013.01);
(Continued)

(58) Field of Classification Search
CPC ................................. B22D 45/00; F27D 19/00
See application file for complete search history.

(56) References Cited

U.S. PATENT DOCUMENTS

| 5,378,144 A | 1/1995 | Cress |
| 6,110,414 A | 8/2000 | Gohres et al. ................ 266/246 |

(Continued)

FOREIGN PATENT DOCUMENTS

| EP | 2 119 989 A2 | 11/2009 |
| EP | 2 423 674 A2 | 2/2012 |

(Continued)

OTHER PUBLICATIONS

International Search Report dated Jun. 18, 2015 issued in corresponding International patent application No. PCT/EP2015/054806.

(Continued)

*Primary Examiner* — Scott R Kastler
(74) *Attorney, Agent, or Firm* — Ostrolenk Faber LLP

(57) ABSTRACT

A metallurgical container (1) includes an outer wall (2), at least one connection element (4) for an electrode which is to be connected and/or a support element which is to be connected, and at least one transponder (3) which is surrounded by a protective housing (6) and can be read wirelessly. The transponder (3) is at a distance from the outer wall (2) on the container (1).

8 Claims, 6 Drawing Sheets

(51) Int. Cl.
  *B22D 45/00* (2006.01)
  *B22D 46/00* (2006.01)
  *C21C 5/46* (2006.01)
  *F27D 21/00* (2006.01)
  *C21C 5/00* (2006.01)
  *G06K 19/07* (2006.01)
  *G06K 19/077* (2006.01)
  *C21C 5/52* (2006.01)

(52) U.S. Cl.
  CPC ............. *C21C 5/00* (2013.01); *C21C 5/4673* (2013.01); *F27D 21/00* (2013.01); *F27D 21/0014* (2013.01); *G06K 19/0723* (2013.01); *G06K 19/07749* (2013.01); *C21C 2005/5288* (2013.01); *Y02P 10/216* (2015.11)

(56) References Cited

U.S. PATENT DOCUMENTS

| | | | |
|---|---|---|---|
| 6,172,367 | B1 | 1/2001 | Fritz et al. |
| 7,942,950 | B2 | 5/2011 | Burty et al. |
| 9,085,029 | B2 | 7/2015 | Truttmann et al. |
| 2003/0080105 | A1 | 5/2003 | Hohenshelt et al. |
| 2013/0194748 | A1* | 8/2013 | Truttmann ............. B22D 41/22 361/694 |

FOREIGN PATENT DOCUMENTS

| | | |
|---|---|---|
| JP | H 05-57426 | 3/1993 |
| JP | H 06-285615 | 10/1994 |
| JP | 2000-512911 | 10/2000 |
| JP | 2014034058 A | 2/2014 |
| RU | 2163713 C2 | 2/2001 |
| RU | 2378389 C2 | 1/2010 |
| SU | 1186384 A1 | 10/1985 |
| WO | WO 95/25818 A1 | 9/1995 |
| WO | WO 2011/101138 A1 | 8/2011 |
| WO | WO 2014/024955 A1 | 2/2014 |

OTHER PUBLICATIONS

Written Opinion dated Jun. 18, 2015 issued in corresponding International patent application No. PCT/EP2015/054806.
Office Action dated Jan. 15, 2018 issued in corresponding Japanese Patent Application No. 2016-557924 with English translation.
Russian Office Action issued in Russian Application No. 2016141081/02(065703) dated Oct. 24, 2018.
A.F. Kablukovskiy, "Herstellung von Elektrosthle and Ferrplegierungen," p. 436 (2003) (with an English translation of the relevant portion of the article).
First Office Action with Search Report dated May 12, 2017 in corresponding Chinese Patent Application No. 201580015049.7 (with English language translation)(total 17 pages).

* cited by examiner

METALLURGICAL CONTAINER

CROSS-REFERENCE TO RELATED APPLICATIONS

The present application is a 35 U.S.C. §§ 371 national phase conversion of PCT/EP2015/054806, filed Mar. 9, 2015, which claims priority of European Patent Application No. 14160813.3, filed Mar. 20, 2014, the contents of which are incorporated by reference herein. The PCT International Application was published in the German language.

The invention relates to a metallurgical container, in particular a container for the accommodation of molten metal.

Such a metallurgical container is employed in high-temperature areas of an industrial works, such as a steel works, in order to transport hot liquids such as molten pig iron, molten steel, liquid slag, scrap or the like. Such a metallurgical container here demonstrates extreme temperature emission.

In order to improve workflows, such as transport, automation and process workflows in a works, it is necessary to know the path and/or the position of such metallurgical containers serving as transport receptacles, at all times.

EP 2 119 989 A2 discloses a holder for an electrical component with good thermal insulating properties. The holder is in particular provided for mounting on smelting crucibles for metal processing.

WO 2014/024955 A1 discloses a system for measurement of a temperature of molten metal to be poured from a casting crucible.

US 2003/0080105 A1 discloses a furnace with a control box, which contains electronic control components.

WO 2011/101138 A1 discloses a monitoring device for slide closures, pouring spout changers, or the like, on a ladle or a similar metallurgical vessel, wherein the device is provided with an electronics unit for capture of the parameters from the monitored apparatus which are of functional importance for casting operations.

EP 2 423 674 A2 discloses a method and an apparatus for temperature and spectroscopic analytical determination of liquid metal baths and slag in a tiltable metallurgical vessel.

WO 95/25818 A1 discloses a support for an oxygen converter vessel for converting iron to steel and with a bearer ring, which is protected against molten metal by a drip edge.

SUMMARY OF THE INVENTION

The invention performs the task of specifying a metallurgical container, which can be identified simply and with certainty over the long term.

The inventive metallurgical container comprises an outer wall, at least one connection element for an electrode to be connected and/or a support element to be connected and at least one transponder, which is surrounded by a protective housing and can be read wirelessly, wherein the transponder is arranged at a distance from the outer wall in an opening in the connection element accessible from outside.

Such an arrangement with a distance from the outer wall of the metallurgical container makes it possible that the protective housing is largely subject only to radiated heat from the metallurgical container and only a small amount of heat penetrates the protective housing of the transponder via heat conduction. Thanks to the inventive arrangement of the transponder at a distance from the metallurgical container, the transponder can be operated securely over an extended period. Instead of the previous situation, involving the operation of an electronics unit in thermal environmental influences of this kind only for brief periods in a purely manual manner or periodically at certain intervals, the invention permits a lasting and low-cost identification of the metallurgical container in harsh and hot environments. Such a metallurgical container is in particular employed in an environment with a high level of temperature emission, for example converters in a steel works or in rotary kilns during the production of cement. Through the arrangement of the transponder in an externally accessible opening in the connection element, the transponder is additionally protected from mechanical damage and also from heat radiation. In addition, assembly is simplified.

In one possible embodiment, at least one spacer is provided, which is arranged between the outer wall and the protective housing of a transponder. The transponder is hereby essentially exposed to heat emission and not to strong heat conduction as is the case with a customary direct and flush arrangement on the container itself.

In one development of the invention, a transponder is arranged near or at the outer wall, at a variable distance therefrom. The heat conduction into the transponder can hereby be correspondingly minimized. The spacer is preferably embodied as a threaded rod. This enables a simple setting of the distance between the transponder and the outer wall of the metallurgical container.

In a further embodiment of the invention, the spacer is itself divided, wherein an insulating element is arranged between two parts of a spacer. In particular the insulating element is embodied as an in particular heat-resistant reflector and/or insulating element, in particular as an insulating plate made of cork, wood, fiberglass material, borosilicate glass, clay or another ceramic material, which reflect the heat radiation and/or are poor conductors of heat.

For further minimizing the thermal stress of the transponder, the outer wall, at least in some areas, is provided with a reflector material, for example borosilicate glass, aluminum, and/or an insulating material, which is a poor conductor of heat, for example cork, fiberglass material or wood. The reflector and/or insulating material can here be applied in the form of a coating or an impregnation.

In addition, the outer wall of the housing, at least in some areas, can be provided with a repellent coating. In particular, the outer wall of the housing and under certain circumstances also the wall of the protective housing of the transponder are provided with the repellent, in particular liquid-pearling coating, for example a so-called nanocoating or glass coating, so that the hot liquid runs off (as in the "lotus effect") and a possible heat effect is only of short duration, and does not penetrate through to the transponder surrounded by the protective housing.

In a further embodiment of the invention the protective housing is provided with a reflector material and/or an insulating material. The reflector and/or insulating material of the outer wall of the housing and/or of the protective housing is preferably heat-resistant, in particular resistant up to a temperature of at least 150° C., particularly of at least 250° C., 280° C., 300° C. or 350° C. The reflector and/or insulating material is preferably fire-proof and fire-resistant and exhibits very good flame-resistant and/or insulation properties. The protective housing is further formed from a material such that it is at least permeable to radio waves for wireless communication. In other words: as well as the good thermal reflector and/or insulating properties of the material of the protective housing, this material is permeable to radio waves. To this end, use is made in particular of heat-resistant plastics, such as polytetrafluoroethylene, polyphenylene sulfide, silicone rubber, polyimide, ethylene-propylene copolymer, cyclic olefin copolymer, polyetherimide, polyethersulfone, polyhydroxyalkanoate, polyhydroxybutyrate, polysulfone, or a mixture of at least two of these materials.

In a further embodiment, the protective housing is provided with a protective cover in the direction of a receiving aperture of the metallurgical container. The top of the protective housing is hereby protected from splashes of the liquid accommodated in the container during transport and against further mechanical stresses. The protective cover preferably comprises a drip edge, so that overflowing liquid can run off.

The outer wall of the metallurgical container can further be provided with at least one support element, in particular a metallic support plate, to which the protective housing of the transponder is fixed in a releasable manner. Mounting and removal of the transponder from the metallurgical container is hereby simplified.

In a further embodiment, the transponder is embedded in a recess of the protective housing. This has the advantage that the plates forming the protective housing lie flat against each other and little bonding material, in particular adhesive, is necessary to join the two plates and thus little heat penetrates.

Alternatively or in addition to the transponder, an electronics unit, in particular for temperature measurement, for the measuring of further physical values, such as pressure, movement, acceleration, for the processing and/or transmission of measured physical values and/or the recording of wear, can be arranged in the protective housing. In addition, the electronics unit and/or the transponder can be supplied with energy by means of a likewise integrated energy storage system or by means of a Peltier element based on the Seebeck effect or in a contactless manner by means of inductive, capacitive or electromagnetic energy transmission. Alternatively, the transponder and/or the electronics unit can also be supplied with energy in a wired manner.

The above-described properties, features and advantages of this invention, as well as the manner in which they are achieved, will be more clearly and distinctly comprehensible in connection with the following description of exemplary embodiments, which are explained in greater detail in conjunction with the drawings.

DESCRIPTION OF EMBODIMENTS

Figure 1:
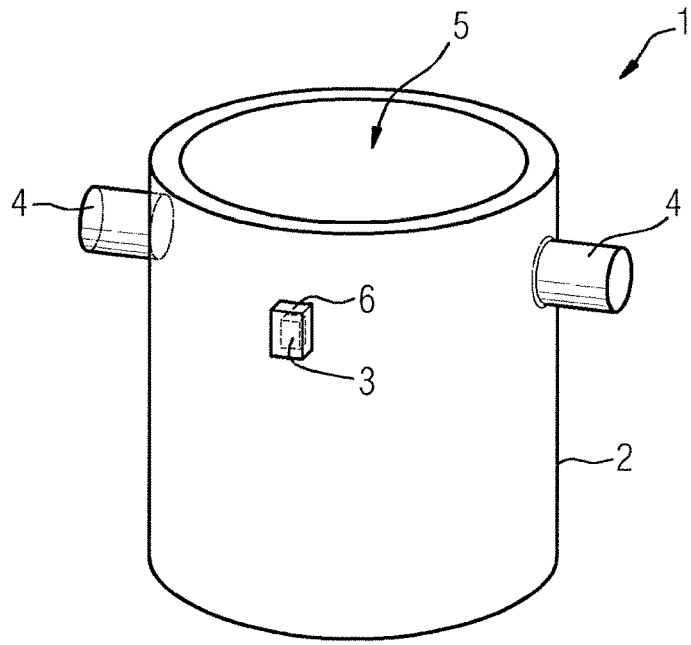
FIG. 1 shows an exemplary embodiment for a metallurgical container with a transponder arranged on its outer wall.

Corresponding parts are provided with the same reference character in all figures.

FIG. 1 shows an exemplary embodiment for an inventive metallurgical container 1. In the case of the metallurgical container 1 this takes the form, in particular, of a transport container in high-temperature areas of an industrial plant, such as a steel works, in order to transport hot liquids, such as molten pig iron, molten steel or liquid slag. Here, the metallurgical container 1 traverses various routes at parts of the plant within the industrial works, and is delivered to the particular parts for use of the material being transported. For the sake of brevity, the metallurgical container 1 will henceforth be referred to as container 1.

For identifying it, the container 1 comprises on its outer wall 2 a transponder 3, which can be read wirelessly. Alternatively or in addition to the transponder 3, an electronics unit, in particular for the measurement of further physical values, such as pressure, temperature, acceleration, and/or for signal processing and/or for data transmission, can be arranged externally on the outer wall 2 of the container 1. In the further text the invention will be described on the basis of the transponder 3 arranged on the container 1. The invention can be applied analogously for the additional or alternative arrangement of an electronics unit on the container 1.

In addition, the container 1 comprises at least one connection element 4. In the exemplary embodiment according to FIG. 1, the container 1 comprises two connection elements 4 in the form of two lateral and in particular oppositely located support elements or trunnions.

The container 1 is open at the top in order to accept a liquid medium, such as molten metal or slag, and comprises a receiving aperture 5.

The transponder 3 is surrounded by a protective housing 6. The transponder 3 can for example take the form of a so-called conventional RFID transponder (RFID=radiofrequency identification) or an SAW transponder (SAW=Surface Acoustic Waves), by means of which the container 1 can be identified automatically and in a contactless manner and its position determined and localized and/or physical values and/or signals determined by means of an electronics unit can be read. Any other transponder which enables clear identification and localization of the container 1 can however be employed.

The transponder 3 can be embodied both as a passive RFID transponder with a power supply through induction of the reading antenna and as an active RFID transponder with embedded power supply, e.g. a buffer battery. If the transponder 3 is embodied as an active RFID transponder, a temperature sensor 11 can additionally be arranged in the protective housing 6, whose measured values are recorded cyclically or after transmission of a corresponding read signal, and written to a memory provided in the transponder 3. This memory can then be read via a receiver running along the container 1 with a receive antenna.

If the transponder 3 is alternatively embodied as an SAW sensor, this can be set up in such a way that the temperature influences the modulation/phase shift of the signal to be read, and can be read as a clear characteristic in addition to the identification of the container 1 and its position.

Use of the wireless transponder 3 has the advantage that the identification of the container 1 can take place without the complex and maintenance-intensive camera systems previously customary, and that permanent identification sustainable over a long period is possible.

Figure 2:
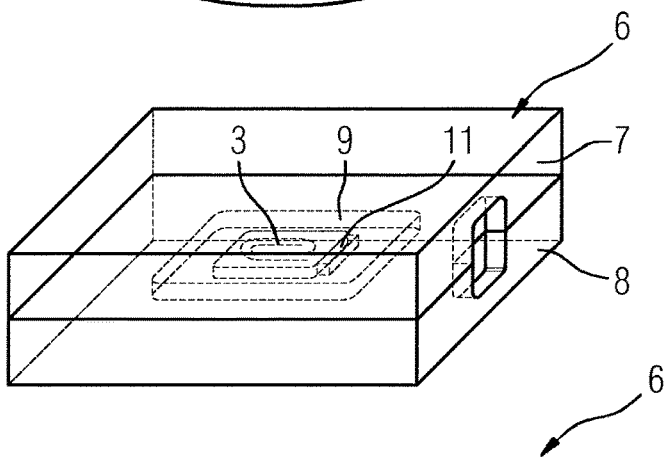
FIG. 2 shows an exemplary embodiment for a transponder embedded in a protective housing.

FIG. 2 shows an exemplary embodiment for the transponder 3 embedded in the protective housing 6. The protective housing 6 according to FIG. 2 is formed from two plates 7 and 8. The plates 7 and 8 are formed from an in particular thermally insulating material, which is for example described in greater detail in the older European patent application EP 13 161 049.5. The protective housing 6 has the advantage that the transponder 3 is protected against mechanical and/or thermal stress, in particular against heat radiation, dust and/or splashes of liquid metal and/or slag.

The insulating material of the protective housing 6 of the transponder 3 has the advantage that, during operation of the container 1, high exterior temperatures and thus a high level of radiated heat from the container 1 (waste heat) leads only slowly to a heating-up of the transponder 3.

Alternatively, in a manner which is not shown in greater detail, the transponder 3 can also be molded in an insulating material, in particular a foam-type or liquid material, which solidifies upon contact with the air.

Embedding of the transponder 3 in the plate-like protective housing 6 takes place via a recess 9 set into one of the plates 7 or 8. In the exemplary embodiment according to FIG. 3, the recess 9 is set into the lower plate 8.

As shown in FIG. 2, the plates 7 and 8 embodied flat on the surface outside the recess 9 can hereby lie flush with each other, so that the plates 7 and 8 can be permanently bonded to each other, in particular by means of an adhesive. The adhesive in particular takes the form of an adhesive which is a poor conductor of temperature. The bonding of the plates 7 and 8 enables simple manufacture of the protective housing 6. Additionally, as a result of the poor temperature-conduction properties of the adhesive, heat penetrates the interior of the protective housing 6 and thus the transponder 3 only with difficulty.

The transponder 3 is held in the recess 9 in particular in a releasable manner, in order in the event of a subsequent fault to be able to remove this in a non-destructive manner and analyze it.

Furthermore, the plates 7 and 8 are provided with indentations 10 on at least one of the edge sides. It is hereby subsequently possible with an appropriate tool to engage the indentations 10 in such a way that the plates 7 and 8 can be released or split. The transponder 3 arranged in a releasable manner in the recess 9 can then be simply removed in a non-destructive manner.

As already mentioned above, further electronics can be arranged in the protective housing 6. In particular, at least one temperature sensor 11 can be arranged in addition to the transponder 3. In an embodiment of the protective housing 6 as a transparent housing, the temperature sensor 11 can be set up in such a way that it exhibits an appropriate color upon a predefined ambient temperature being reached. Upon failure of the transponder 3 it can thereby be determined whether the maximum permissible temperature of the transponder 3 has been reached. It is thus possible, in a simple manner, to determine the occurrence of the maximum internal temperature in the event of malfunctioning of the transponder 3.

As already mentioned above, because of the indentations 10, the plates 7 and 8 can be separated from each other without damaging the temperature sensor 11 and the transponder 3 located therein.

Figure 3:
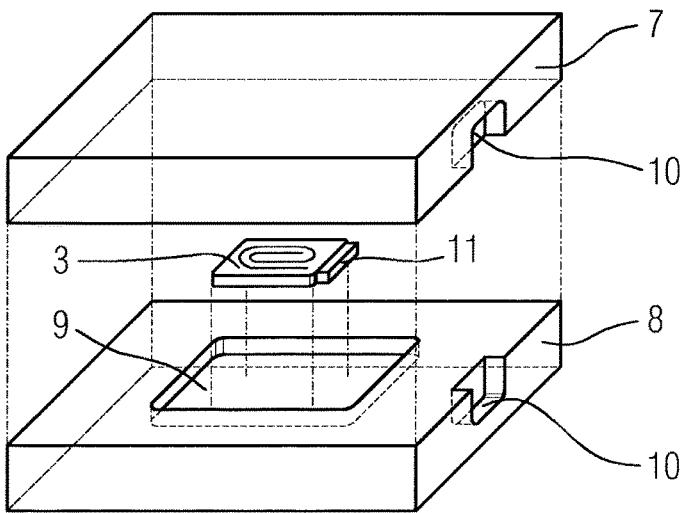
FIG. 3 is an exploded diagram of a further exemplary embodiment for a transponder which may be embedded in a protective housing.

FIG. 3 shows, in an exploded diagram, the transponder 3 to be embedded in the protective housing 6.

Figure 4:
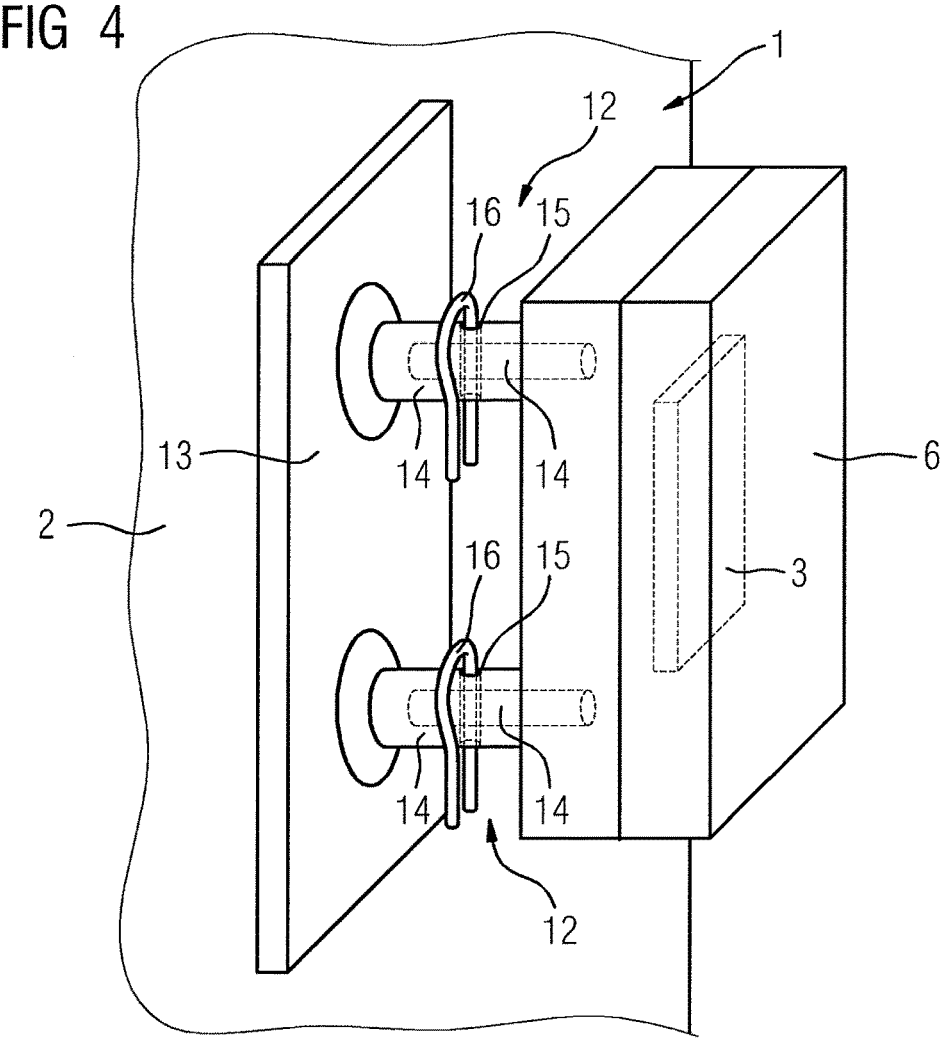
FIG. 4 shows, in enlarged form, an exemplary embodiment for an arrangement of a transponder on an outer wall of a metallurgical container.

FIG. 4 shows, in enlarged form, an exemplary embodiment for an arrangement of the transponder 3 on the outer wall 2 of the container 1. As shown, the transponder 3 is here not arranged flush on the container 1, but at a distance from the container 1. Heat input as a result of heat conduction into the protective housing 6 is hereby minimized.

To this end, the protective housing 6 is held on the outer wall 2 of the container 1 by means of spacers 12. For variable setting of the distance between the protective housing 6 and the container 1, the spacers 12 are embodied as threaded rods.

For further minimization of the heat input into the protective housing 6, the spacers 12 can here be embodied from the same thermally insulating material as the protective housing 6. Through the distancing of the protective housing 6 from the outer wall 2 of the container 1, the transponder 3 and its protective housing 6 are essentially exposed only to the radiated heat of the container 1.

In addition, it can be provided for a support element 13, for example in the form of a metal plate or a fiber-reinforced plastic plate, to be arranged in the area of the fixing of the protective housing 6 on the container 1. The container 1 itself is generally manufactured from a heat-resistant metal, so that the support element 13 is welded onto the container 1 in the form of a metal plate.

The fixing of the protective housing 6 on the container 1 is preferably embodied in such a way that this can be released without the use of a tool and that this is largely closed to prevent the ingress of dirt. To this end it is for example provided for the spacer 12 to be formed from two bolts 14, capable of insertion one inside the other, which in each case have at least one through-opening 15. The bolts 14 are here arranged relative to each other in such a way that their through-openings 15 lie one above the other. An insert element 16, in particular a sprung insert can then be guided through and held in the through-openings 15 of the inner and outer bolts 14, in particular inserted.

A multiplicity of through-openings 15 can be provided in the longitudinal direction of the bolts 14, so that the distance between outer wall 2 and protective housing 6 can be set in a variable manner.

One of the bolts 14 is fixed to the outer wall 2, in particular on the support element 13, in a form-fitted, non-positive and/or materially bonded manner, in particular welded or bonded. The other bolt 14 is fixed to the protective housing 6 in a form-fitted, non-positive and/or materially bonded manner, in particular welded or bonded.

In addition both the outer wall 2 and the protective housing 6 or just one of the two can be provided with a heat-insulating and/or heat-reflecting coating.

Figure 5:
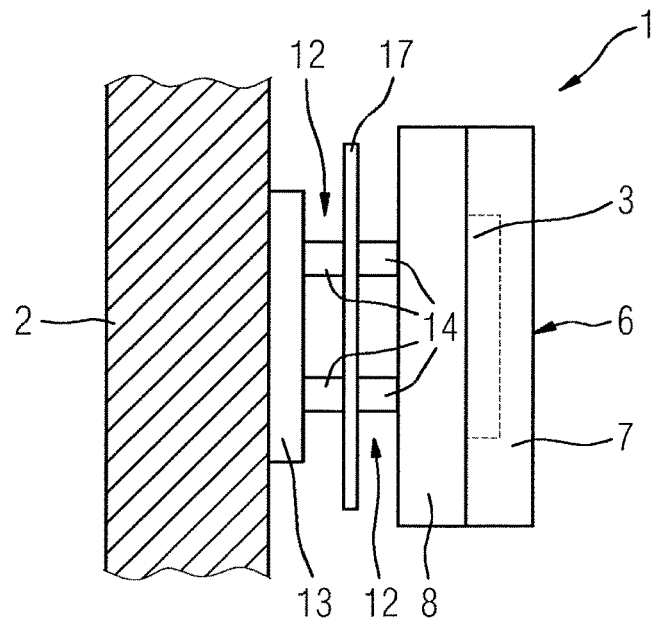
FIG. 5 shows, in enlarged form, a further exemplary embodiment for an arrangement of a transponder on an outer wall of a metallurgical container.

FIG. 5 shows, in enlarged form, an alternative exemplary embodiment for an arrangement of a transponder 3 on an outer wall 2 of a container 1. In addition to the distancing of the protective housing 6 from the outer wall 2 by means of the spacer 12, an insulating element 17 is provided. The spacer 12 is here formed from divided bolts 14, between which is arranged the insulating element 17.

The insulating element 17 is arranged between the outer wall 2 of the container 1 and rear wall of the protective housing 6 pointing in the direction of the container 1. The insulating element 17 can here be formed from a reflector material, so that heat radiated from the container 1 is reflected and is not radiated onto the protective housing 6.

The insulating element 17 at least in part or in some areas, in particular on the surface facing the container 1, is provided with a reflector material. Alternatively, the insulating element 17 can be completely formed from the reflector material or from an insulating material with poor heat conduction properties, with a reflective coating or further alternatives from a combination of reflector material and/or insulating material.

The reflector material is in particular a fiberglass material fused by sintering, a borosilicate glass, a clay or another ceramic material or a combination of these. The insulating material is in particular a cork, a wood, a plastic, a ceramic material, a fiberglass material or another suitable material or a combination thereof.

The protective housing 6 is in particular manufactured from a material such that it is permeable to electromagnetic waves within the frequency range of the transponder 3. The protective housing 6 can also be formed at least from an insulating material and/or in the external area from a reflector material.

The reflector material of the insulating element 17 and/or of the protective housing 6 makes it possible, in a particularly simple manner, for heat radiated from the container 1 and/or the environment to be reflected before penetrating the insulating material of the protective housing 6.

The reflector material of the insulating element 17 can be manufactured from a material such that it reflects electromagnetic waves in the frequency range of the transponder 3 away from the container 1 or is permeable to these waves with minimal attenuation.

If, on grounds of cost, a reflector material is employed which has lower thermal insulation properties, but is somewhat heat-retentive, then a gap can be provided between the reflector material and the insulating material in the case of a multilayer structure of the insulating element 17 or between the reflector material and the protective housing 6, in order to minimize heat input into the protective housing 6 as a result of heat conduction.

Figure 6:
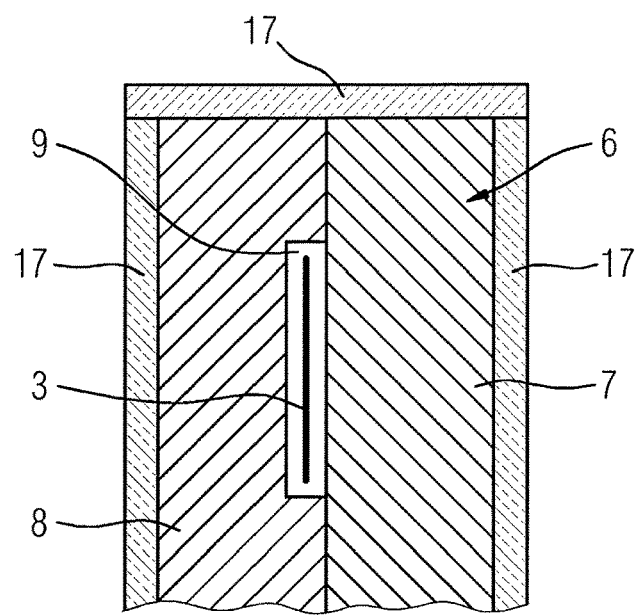
FIG. 6 shows, in a cutaway view, an exemplary embodiment for a transponder embedded in the protective housing.

FIG. 6 shows in a cutaway view, a further exemplary embodiment for a transponder 3 embedded in the protective housing 6. In this exemplary embodiment, the transponder 3 is completely surrounded by the insulating element 17 in the manner of a cladding layer. The heat input resulting from heat radiation from other further vessels and/or the environment can be minimized hereby.

The protective housing 6 can also be provided with different reflector materials. Thus a heat-repellent and less dirt-repellent, in particular a rough material, can be applied to the surface of the protective housing 6 facing the container 1, whereas a dirt-repellent, in particular a smooth material (with lotus effect), can be applied to the surface of the protective housing 6 facing outwards away from the container 1.

On surfaces of the protective housing 6 subject in particular to severe mechanical stress and dirt, such as splashes and dust, the protective housing 6 can be embodied in a material which is comparatively tough and in the case of direct contact with slag, molten steel or iron, largely heat-resistant and sufficiently robust and liquid-pearling, so that no mechanical damage occurs, and the slag or molten metal readily flows or drips off it.

If, on grounds of cost, a rough substance is employed as material for the protective housing 6, a reflector material, as described in the older EP 13 161 049.5, can thus be used.

Figure 7:
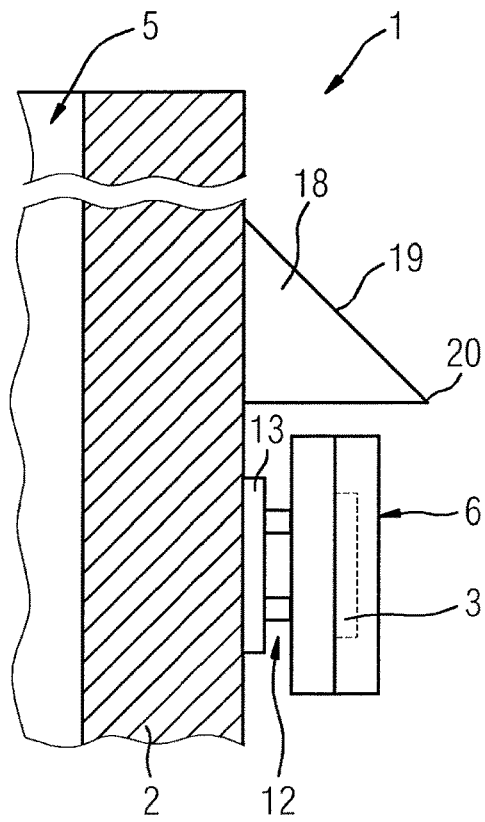
FIG. 7 shows a side view of an exemplary embodiment for a protective cover for a transponder embedded in the protective housing.

FIG. 7 shows in side view an exemplary embodiment for a protective cover 18 for a transponder 3 embedded in the protective housing 6 with a spacer 12 for fixing at a distance from the outer wall of the container 1. The protective cover 18 is arranged in the direction of the receiving aperture 5 of the container 1 on the protective housing 6 and thus above this. The protective cover 18 has a slope 19 slanting away from the receiving aperture 5 of the container 1 and the protective housing 6, the lower end of which in particular projects beyond the top of the protective housing 6 and forms a drip edge 20. The drip edge 20 prevents liquid slag or molten metal dripping over the protective cover 18 from flowing back onto the protective housing 6, in particular in the case of a slight inclination of the container 1 for example during transport.

In FIG. 7 the protective cover 18 is fixed to the outer wall 2 and arranged at a slight distance from the top of the protective housing 6.

Figure 8:
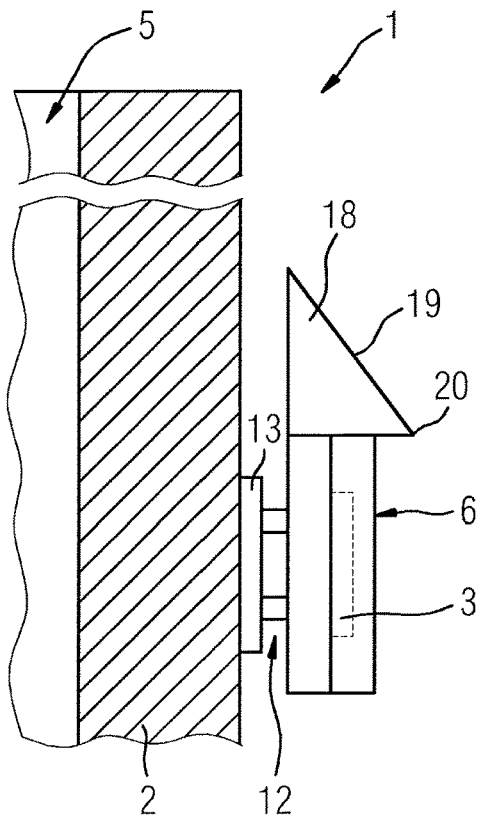
FIG. 8 shows a side view of a further exemplary embodiment for a protective cover for a transponder embedded in the protective housing.

FIG. 8 shows in side view a further exemplary embodiment for a protective cover 18, which is arranged and fixed on the protective housing 6 of the embedded transponder 3.

The protective housing 6 with the embedded transponder 3 is arranged at a point on the container 1 at which both the heat occurring and the danger from mechanical stresses are largely minimal.

The positions of the read antennae in the vicinity are additionally taken into consideration for simple and certain reading of the transponder 3. For this reason, the arrangement and fixing of the protective housing 6 with the transponder 3 can be arranged in a releasable and adjustable manner on the outer wall 2 of the container 1.

Figure 9:
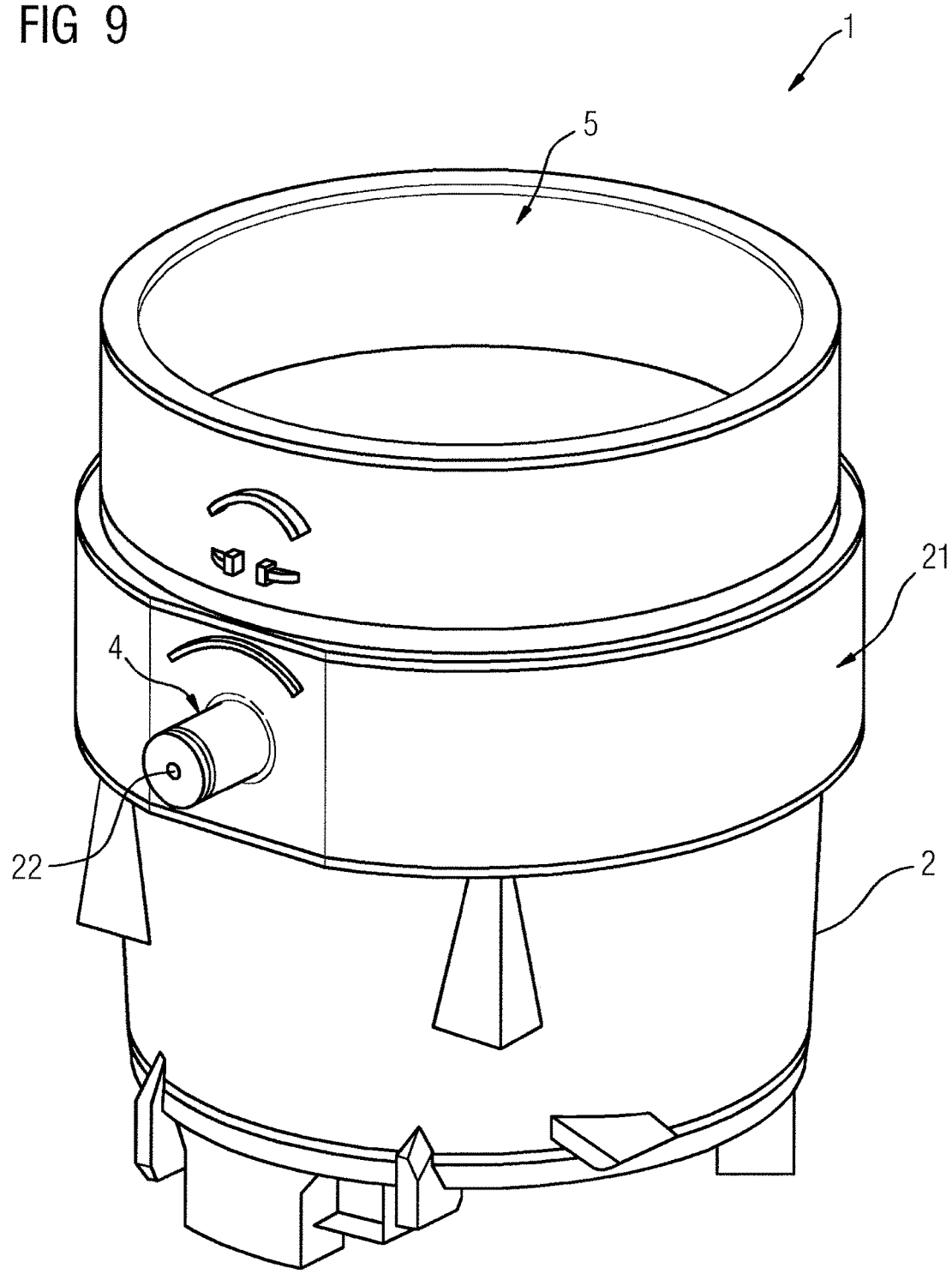
FIG. 9 shows, in three-dimensional form, a further exemplary embodiment of a metallurgical container with a transponder arranged in the connection element.
Figure 10:
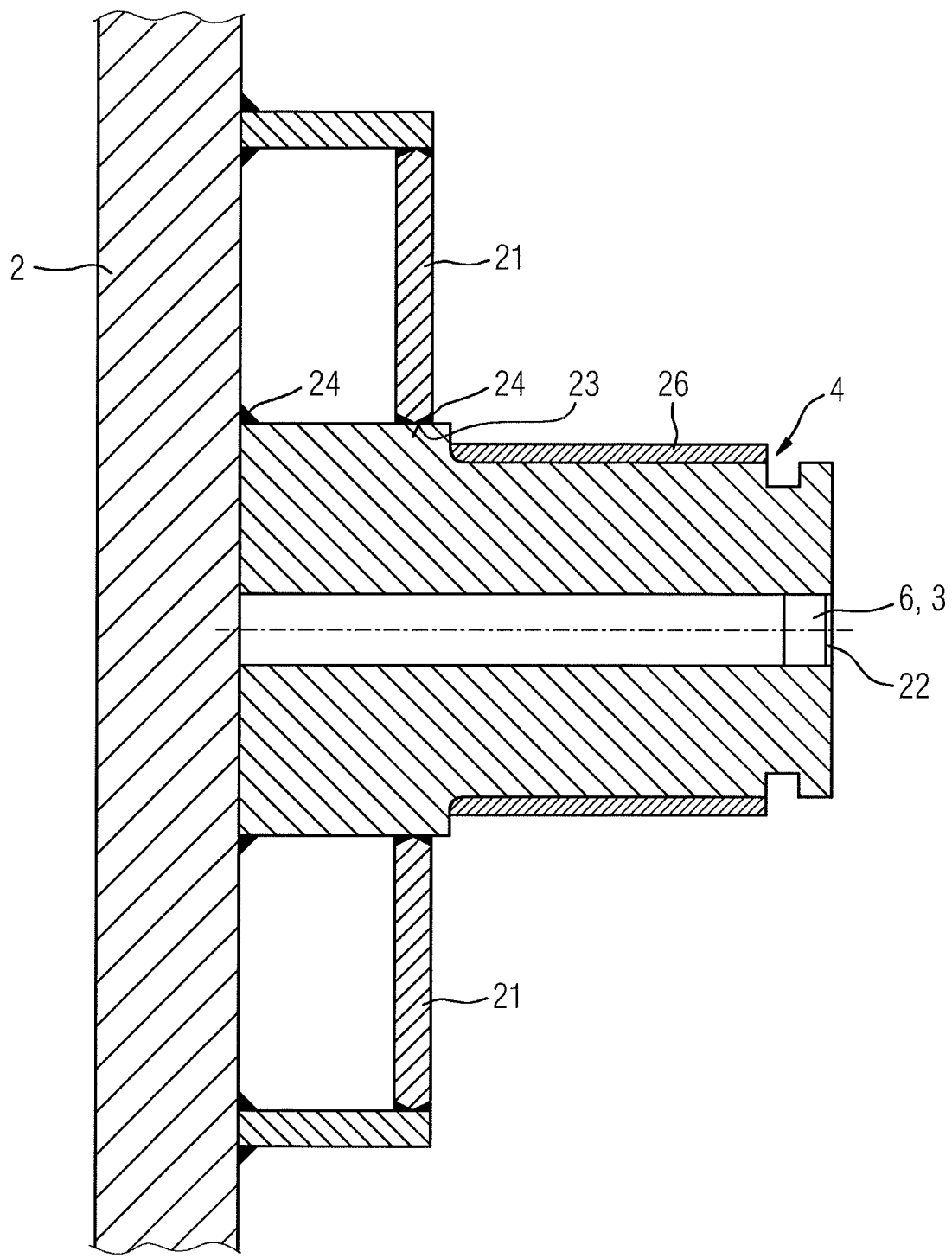
FIG. 10-12 show, in various views, in each case an exemplary embodiment for a transponder arranged in the connection element.

FIG. 9 and FIG. 10 show in three-dimensional or cutaway form respectively a further exemplary embodiment of a container 1 with a transponder 3 arranged in the connection element 4.

Underneath the receiving aperture 5 the container 1 has a circumferential annular element 21, which is for example fixed to the outer wall 2 in a non-positive and/or form-fitted manner. In particular the annular element 21 can be embodied as an adjustment ring and arranged on the container 1 in a releasable manner.

Figure 11:
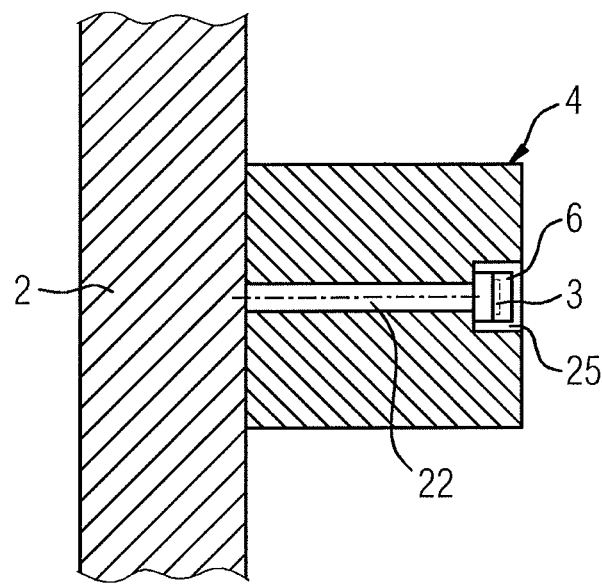
Figure 12:
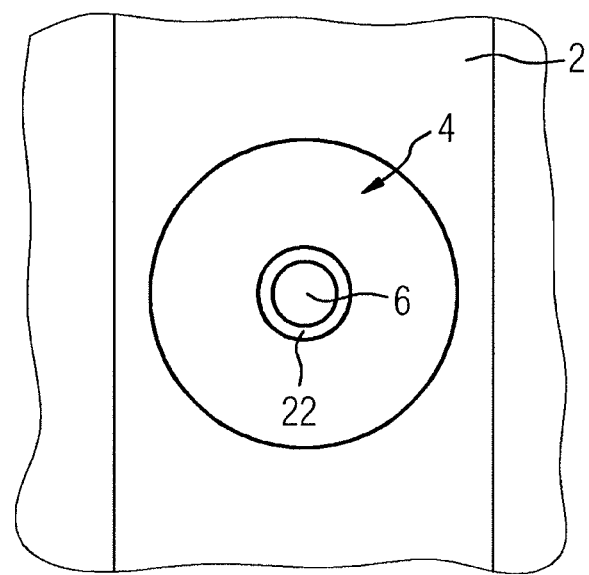

On the surface at least one connection element 4 in the form of a trunnion projects from the annular element 21. The connection element 4 has an opening 22 which is open to the outside, in which the transponder 3 is arranged, as shown in FIGS. 10 to 12. The connection element 4 is arranged in a recess 23 of the annular element 21 and fixed, in particular welded, at points of contact 24 in a form-fitted, non-positive and/or materially-bonded manner. The connection element 4 here extends through the annular element 21 as far as the outer wall 2, to which the connection element 4 is fixed, in particular welded, at further points of contact 24 in a form-fitted, non-positive and/or materially-bonded manner.

Alternatively the protective housing 6 can be arranged in a releasable manner on a support element, which is not shown in greater detail, which can likewise be arranged in a releasable and adjustable manner on the outer wall 2 of the container 1.

Here, the opening 22 extends essentially over the entire longitudinal axis of the connection element 4 in the form of a through-hole. The opening 22 here serves to provide the orientation of the connection element 4 upon assembly on the container 1.

The opening 22 is furthermore embodied in such a way that this can accommodate the protective housing 6 with the embedded transponder 3. The opening 22 here essentially corresponds with the dimensions of the protective housing 6, so that the protective housing 6 is completely countersunk in the opening 22 and does not protrude from the opening 22. The protective housing 6 is hereby protected against mechanical stress, so that mechanical damage is prevented. Additionally, neither does the protective housing 6 come into contact with splashes running down the outer wall 2, in particular splashes of slag.

Depending on the embodiment of the protective housing 6 this can also exhibit a circular or cylindrical form.

In addition the connection element 4 can be provided with a coating 26. The coating 26 can be formed from an insulating and/or reflector material or a dirt-repellent material.

FIG. 11 shows a further embodiment for accommodation of the protective housing 6 in the connection element 4. An outwardly oriented end 25 of the continuous opening 22 of the connection element 4 is widened for accommodation of the protective housing 6.

FIG. 12 shows a view from outside the connection element 4 into the opening 22 with the protective housing 6 arranged therein.

Although the invention has been further illustrated and described in detail by means of a preferred exemplary embodiment, the invention is not limited by the disclosed examples and other variations can be derived by the person skilled in the art, without departing from the scope of the invention.

The invention claimed is:

1. A metallurgical container, comprising:
   an outer wall;
   at least one connection element at the outer wall for an electrode to be connected and/or a support element to be connected; and
   a recess defined in the at least one connection element and having a bottom spaced from the outer wall;
   at least one transponder capable of being read wirelessly; and
   a protective housing surrounding the transponder;
   wherein the protective housing resides in the recess at the bottom, whereby the transponder is spaced at a distance from the outer wall,
   wherein the connection element is in the form of a trunnion, and
   wherein the connection element has an opening at a distal end thereof, and the protective housing is accessible while in the recess through the opening at the distal end of the connection element.

2. The metallurgical container as claimed in claim 1, wherein the outer wall includes at least in some areas, a heat reflector material and/or a heat insulating material,
   wherein the heat reflector material comprises a material selected from a group consisting of borosilicate glass and aluminum, and
   wherein the heat insulating material comprises a material selected from a group consisting of cork, fiberglass, and wood.

3. The metallurgical container as claimed in claim 2, wherein the outer wall, includes at least in some areas thereof, a liquid metal repellent coating that comprises a nanocoating or a glass coating.

4. The metallurgical container as claimed in claim 2, wherein the protective housing is provided with a heat reflector material and/or a heat insulator comprising a material or a mixture of at least two materials selected from a group consisting of polytetrafluoroethylene, polyphenylene sulfide, silicone rubber, polyimide, ethylene-propylene copolymer, cyclic olefin copolymer, polyetherimide, polyethersulfone, polyhydroxyalkanoate, polyhydroxybutyrate, polysulfone.

5. The metallurgical container as claimed in claim 1, further comprising at least one support element on the outer wall, to which the protective housing of the transponder is fixed in a releasable manner.

6. The metallurgical container as claimed in claim 1, further comprising a recess in the protective housing in which the transponder is arranged.

7. The metallurgical container as claimed in claim 1, further comprising an electronics unit in the protective housing in addition to the transponder.

8. A metallurgical container, comprising:
   an outer wall;
   at least one connection element at the outer wall for an electrode to be connected and/or a support element to be connected; and
   a recess defined in the at least one connection element and having a bottom spaced from the outer wall;
   at least one transponder capable of being read wirelessly; and
   a protective housing surrounding the transponder;
   wherein the protective housing resides in the recess at the bottom, whereby the transponder is spaced at a distance from the outer wall,
   wherein the protective housing is completely countersunk in the recess and does not protrude from the recess.

* * * * *